United States Patent Office 3,523,391
Patented Aug. 11, 1970

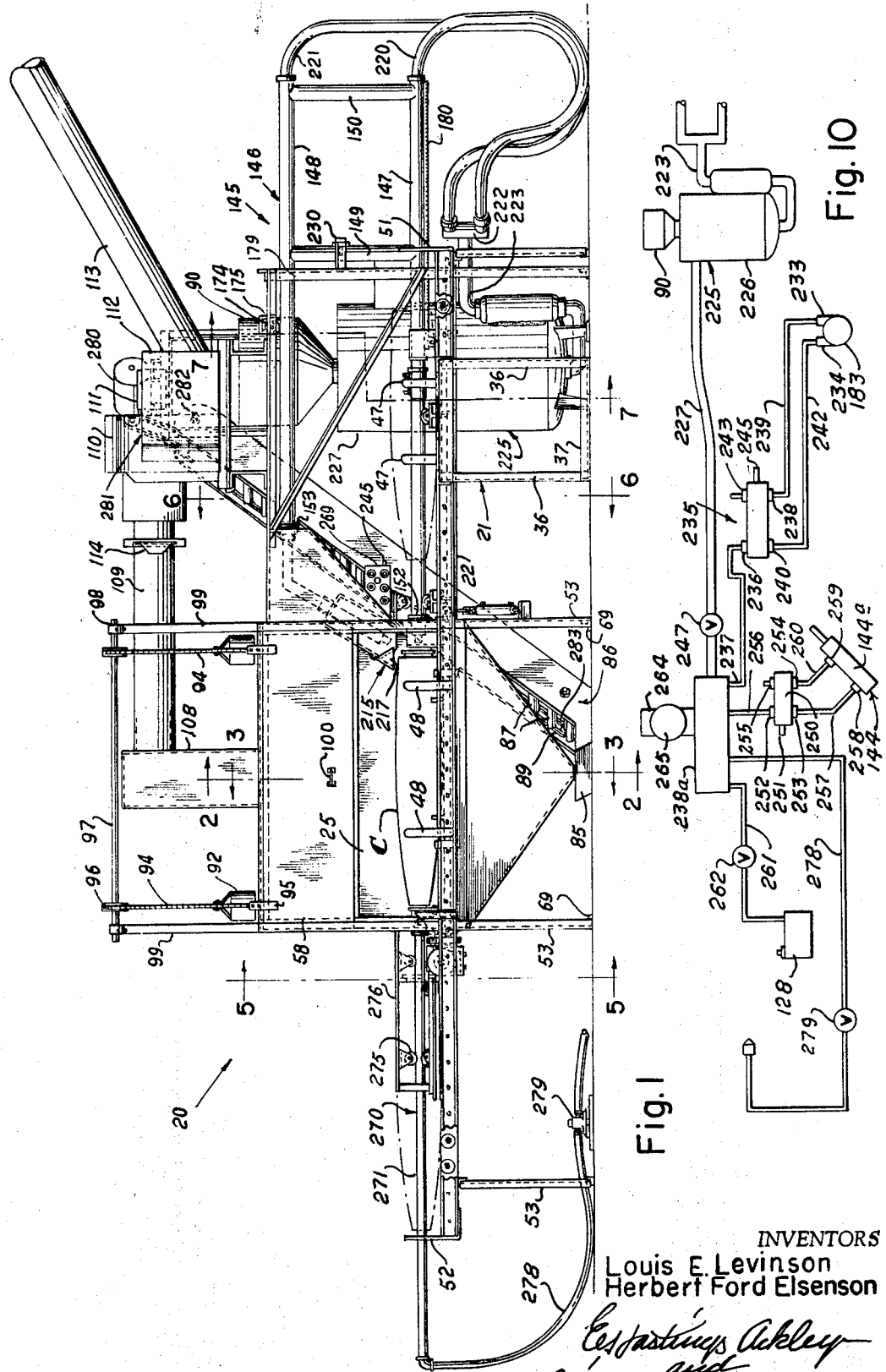

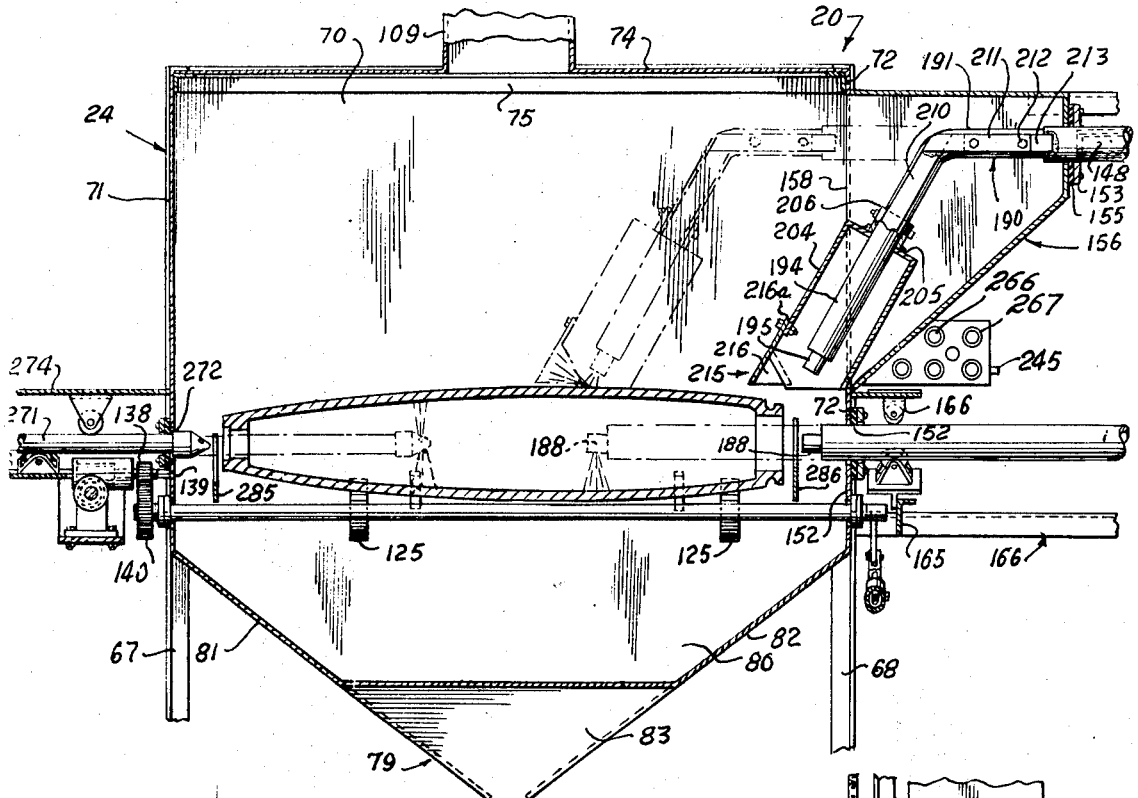
Fig. 4
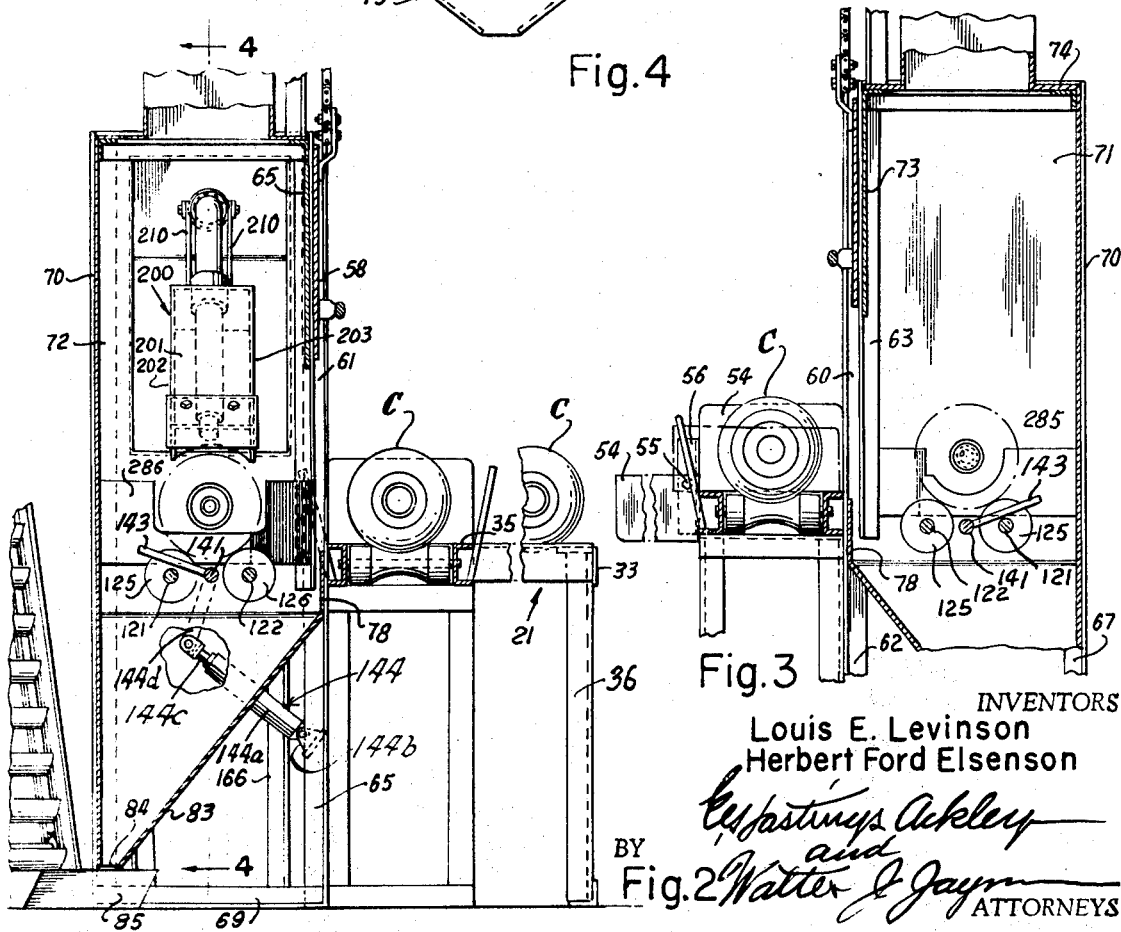
Fig. 3
Fig. 2
INVENTORS
Louis E. Levinson
Herbert Ford Elsenson
BY
ATTORNEYS

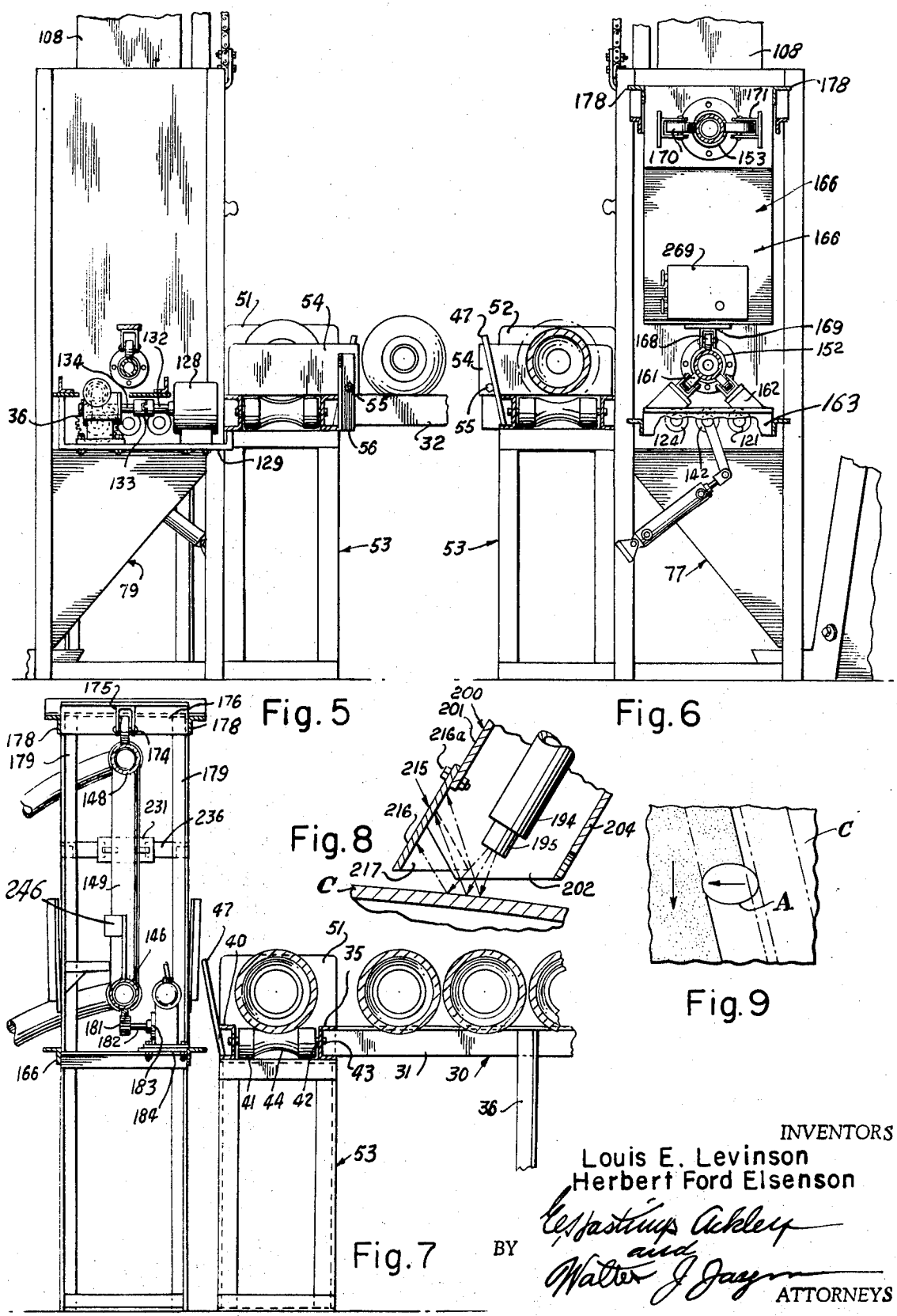

3,523,391
ABRASIVE BLAST CLEANING APPARATUS
Louis E. Levinson and Herbert Ford Elsenson, Dallas, Tex., assignors to Intercontinental Manufacturing Company, Inc., Garland, Tex., a corporation of Texas
Filed Mar. 13, 1967, Ser. No. 622,629
Int. Cl. B24c 3/08
U.S. Cl. 51—8                                           14 Claims

ABSTRACT OF THE DISCLOSURE

An apparatus for cleaning cylindrical bodies such as bomb casings, which include a storage rack which the cylindrical bodies may be stored in horizontal longitudinally parallel positions, a conveyor extending perpendicularly to the rack and onto which the casings are movable from the rack for transport thereby into longitudinal alignment with an opening in a housing through which such casing is movable onto a support means in the housing for supporting and rotating a casing about its horizontal axis, nozzle means movable longitudinally relative to the cylindrical body supported and rotated by the support means to subject small areas of the internal and external surfaces of the casing to blasts of abrasive particles, hood means associated with the nozzle means which directs a spray on the external surfaces of the casing for limiting the movement of particles ricocheting off the external surface of the cylindrical body, means for withdrawing air dust and dirt from the housing during the operation of the cleaning means, and means for moving the cleaned casings back onto the conveyor through the housing opening.

---

This invention relates to cleaning apparatus and more particularly to cleaning apparatus for cleaning elongate cylindrical bodies.

An object of this invention is to provide a new and improved cleaning apparatus for cleaning surfaces of a cylindrical body, such as bomb casing, by directing sprays or blasts of abrasive particles onto the surfaces of the casings by nozzle means which are movable longitudinally relative to such casing as the casing is being rotated about its longitudinal axis.

Another object is to provide a cleaning apparatus wherein the casings are in horizontal positions wherein their longitudinal central axes are horizontal during their movement to the cleaning apparatus, during their cleaning in the cleaning apparatus, and during their removal from the apparatus.

Still another object is to provide a cleaning apparatus which has a storage rack on which the casings are stored in horizontal longitudinally parallel relation to one another, a conveyor at one end of the storage rack extending perpendicular thereto onto which the casings may be sequentially moved from the storage rack for transport thereby to a side opening of a housing for movement therethrough onto a support means which supports and rotates the cylindrical body during the cleaning thereof by the abrasive blasts.

A further object is to provide a cleaning apparatus wherein the means for providing abrasive blasts or sprays includes a carriage movable longitudinally relative to the housing and having a pair of spaced nozzles for directing sprays or blasts of abrasive particles simultaneously at the internal and external surfaces of a casing being rotated by the support means in the housing.

A still further object is to provide a cleaning apparatus wherein the carriage and the support means are driven by means located externally of the housing at predetermined relative speeds to cause all internal and external surfaces of the casings to be subjected to the blasts of abrasive particles during each complete cycle of a reciprocable movement of the carriage so that all surfaces of the cylindrical body are subjected twice to a blast of abrasive particles.

Another object is to provide cleaning apparatus having a control system for operation of the carriage which causes the carriage to reverse direction upon reaching the forward limit of its forward movement relative to the housing during each cycle of its reciprocable movement.

Still another object is to provide a cleaning apparatus having means operable from the exterior of the housing for cleaning the interior of the cylindrical body of abrasive and dirt particles after the completion of the cleaning operation.

Additional objects and advantages of the invention will be readily apparent from the reading of the following description of a device constructed in accordance with the invention, and reference to the accompanying drawings thereof, wherein:

FIG. 1 is a front view, with some parts broken away, of a cleaning apparatus embodying the invention showing a casing in position in the housing and the door of the housing in open position;

FIGS. 2, 3, 5, 6 and 7 are sectional views taken on lines 2—2, 3—3, 5—5, 6—6 and 7—7, respectively, of FIG. 1;

FIG. 4 is a sectional view taken on line 4—4 of FIG. 2;

FIG. 8 is a fragmentary enlarged view illustrating the manner in which the hood of the apparatus prevents grit particles ricocheting from the external surface of the casing from forcibly impinging on the internal walls of the housing or the elements of the apparatus disposed in the housing;

FIG. 9 is an enlarged fragmentary sectional view illustrating the manner in which a spray of abrasive particles is directed on a small area of the external surface of a casing during its rotation; and FIG. 10 is a schematic view of the pneumatic drive and control system of the apparatus.

Referring now to the drawings, the apparatus 20 embodying the invention for cleaning both internal and external surfaces of cylindrical bodies, such as bomb casings C, includes a storage rack 21 on which a plurality of the casings may be supported in horizontal position, a conveyor 22 which extends perpendicular to the storage rack onto whose rear end portion casings may be rolled off the inner end of the storage rack, and a housing 24 provided with a side opening 25 past which the conveyor extends so that the casings may be easily rolled off the conveyor into the housing and then, after being cleaned in the housing, be moved from the housing back onto the conveyor.

The storage rack has a top frame 30 having side angle members 31 and 32 connected at the outer end of the rack by an end angle member 33. The inner ends of the side angle members 31 and 32 extend to the side channel member 35 of the conveyor and are connected thereto by welding. The top frame is held at a desired height by a plurality of transversely aligned pairs of legs 36 which may be connected by base angle members 37. The various members of the storage rack may be rigidly secured to one another in any suitable manner, as by welding.

The conveyor 22 includes outer and inner side channel members 35 and 40, respectively, between which extend a plurality of spaced rollers 41 rotatably mounted on the side channel members by means of shafts 42 which extend through suitable aligned apertures in the webs of the channel members and are secured against removal therefrom by any suitable means, such as nuts 43 threaded on the outer ends of the shafts. The rollers have arcuate grooves 44 therein whose curvature corresponds to the greatest radius of curvature of the external surface of the casings.

The top surfaces of the storage rack side members 31 and 32 are disposed at substantially the same level or slightly higher than the top surface of the top flange of the outer channel member 35 of the conveyor so that a slight force must be imparted to the casings to cause them to roll over the outer side channel member 35 onto the rollers of the conveyor. Since the middle portions of the casings are of greater diameter than their end portions, the casings do not tend to be displaced transversely of the side members of the storage rack when placed thereon but will easily roll therealong as illustrated in the drawings.

The inner conveyor channel member has upwardly extending retainer bars 47 aligned with the inner or discharge end of the storage rack to prevent accidental rolling of the casings over the conveyor rollers and over the inner channel member of the conveyor. The outer side channel member 35 similarly has a pair of upwardly extending retainer bars 48 secured thereto which are aligned with the housing side opening 25 to prevent accidental movement of the casings over the outer side channel member during their movement from the housing back onto the conveyor after their cleaning. The conveyor is provided at its opposite ends with upwardly extending stop plates 51 and 52 which prevent the casings from rolling off the ends of the conveyor. The side channel members of the conveyor are secured to and supported on rectangular frames 53 formed of angle members. The conveyor channel members may be welded to the frames.

A positioning plate 54 is pivotally secured by a shaft or bolt 55 to an angle bracket 56 welded to the outer side channel member and is movable between its inoperative position illustrated in FIG. 3, wherein it extends outwardly of the outer channel member 35 and does not prevent movement of the casings over the conveyor toward the front stop plate 52, and its operative position illustrated in FIGS. 5 and 6, wherein it extends over the side channel members so that the forward movement of a casing on the conveyor is arrested by the engagement of its front end therewith when the casing is in alignment with the housing opening.

The opening of the housing is closable by vertical slidable door 58 whose opposite side portions extend into vertical grooves 60 and 61. The groove 60 is provided by the parallel flanges of a front corner column 62 and an inner angle member 63. The other groove 61 is similarly provided by the other front corner column 65 and an inner angle member 66. The housing also has rear corner columns 67 and 68. It will be apparent that the housing is supported by the corner posts. The corner columns may be connected at their bottom ends by brace angle members 69.

The housing includes a rear wall 70 which extends between the rear columns 67 and 68, a side wall 71 which extends between the columns 62 and 67, a side wall 72 which extends between the columns 65 and 68, a front wall 73 which extends between the front columns 62 and 65, and a top wall 74. A rectangular top brace frame 75 may be provided to give greater rigidity and strength to the top portion of the housing. The walls of the housing may be connected to one another, the brace frame and the columns by welding or in any suitable manner.

The bottom edge of the front wall defines the top end of the housing opening 25 and its bottom end is defined by the top edge of the front wall 78 of the hopper 79. The hopper is formed by extensions 80, 81 and 82 of the housing walls 70, 71 and 72, respectively, and the lower rearwardly and downwardly extending extension 83 of the front hopper wall. The extensions decrease in width downwardly to cause the hopper to have a progressively smaller cross sectional area and to cause its throat or discharge opening 84 in the lower end of the hopper to be of small orifice. Grit particles used in the cleaning of the casings fall onto the hopper walls and move by gravity over the convergently sloping extensions 81, 82 and 83 to the discharge opening and thence into a receptacle or trough 85 positioned therebelow.

A conveyor 86 of any suitable type, as, for example, of the type having buckets 87 connected to endless chains 89, is used to move the grit particles accumulating in the receptacle to a storage hopper 90, as will be explained in greater detail below.

The weight of the door 58 is balanced by a pair of weights 92 secured to the rear ends of the chains 94. The front ends of the chains are secured by means of brackets 95 to the upper end portion of the door. The chains extend over sprockets 96 rigidly secured to a shaft 97 rotatably supported by means of suitable pillow blocks 98 secured to the top ends of posts 99 mounted on the top of the housing. The door has a handle 100 by means of which it may be moved between its upper open position and its bottom closed position. The door will tend to remain in any position to which it is moved due to its frictional engagement with the surfaces defining the grooves in which its outer side portions are slidable.

The top wall has an exhaust stack 108 connected by a horizontal duct 109 to the inlet end of a blower device 110 which is operated by an electric motor 111. The outlet end of the blower device discharges into a plenum 112 to which opens an exhaust duct 113. A suitable valve 114 may be provided in the duct 109 and is movable inwardly to close the duct 109 if it is desired to operate the apparatus while not operating the blower 110.

It will be apparent that when the door 58 is in its lower closed position, and the blower is in operation substantially all or most of the air being moved by the blower is drawn into the housing upwardly through the hopper discharge opening 84 at a great velocity so that any light particles of dust, dirt and the like blasted off the surfaces of the casings are transported upwardly to the exhaust stack and only the heavy grit particles will fall through the discharge opening 84 into the receptacle 85.

A pair of support shafts 121 and 122 extend through the housing and are rotatably supported by suitable bushings 124 rigidly secured in any suitable manner to the housing side walls 71 and 72. The shafts 121 and 122 are provided with longitudinally spaced wheels 125 and 126, respectively, rigid therewith and formed of relatively hard rubber and the like, on which the casings rest.

The shaft 121 is rotated by a suitable prime mover such as a pneumatic motor 128 mounted on a support plate or bracket 129 which is rigidly secured as by welding to one of the conveyor support frames 53 as illustrated in FIG. 5. The drive shaft 132 of the motor is connected by a suitable coupling 133 to the input shaft 134 of a speed reducing transmission 136 also rigidly secured to the mount plate 129. The output shaft 138 of the speed reducing transmission is provided with a gear 139 which meshes with a gear 140 rigidly secured to the support shaft 121 exteriorly of the housing.

It will be apparent that when the motor 128 is energized, the shaft 121 is rotated and if the casing is now supported on the wheels 125 and 126, the rotation of the shaft 121 will cause the casing to rotate and, as a result, the shaft 122 will also rotate to permit such rotation of the casing.

A casing removal device for moving the casing from the wheels of the support shafts and back onto the conveyor includes a shaft 141 journalled in suitable bearings or bushings 142 secured to the side walls and having arms 143 which are engageable with a casing supported on the wheels 125 and 126 when the shaft 141 is rotated in a clockwise direction, FIG. 2, by a pneumatic ram 144 whose cylinder 144a is pivotally secured to a bracket 144b rigidly secured to the corner column 62 and whose piston rod 144c is pivotally secured to the outer end of an arm 144d rigid with the shaft.

An abrasive blast assembly 145 of the cleaning apparatus includes a pipe carriage 146 having a pair of vertically spaced horizontal pipes 147 and 148 rigidly connected at their rear end portions by a pair of vertical brace members 149 and 150. The inner end portions of the pipes extend through suitable bushings 152 and 153, respectively, into the housing. The bushing 153 is secured to the outer vertical wall 155 of a housing extension 156 which opens to an opening 158 in the housing side wall 72 and is rigidly secured to the housing side wall 72 in any suitable manner, as by welding and the like. The bottom pipe 147 of the carriage 146 is supported on a plurality of pairs of guide and support rollers 161 rotatably mounted on suitable brackets 162, the brackets 162 being secured as by welding to angle members 163 which may be secured to a rectangular support frame 166 which may also be formed of angle members. An upper guide wheel 168 is rotatably mounted on a bracket 169 which is secured to the side wall so that the lower pipe 147 at the location of its entry into the carriage is supported against upward movement.

The upper pipe 148 is held against lateral displacement by a pair of guide wheels 170, FIG. 6, rotatably mounted on brackets 171 rigidly secured as by welding to the wall 155 of the housing extension 156 and against upward movement by a guide wheel 174 rotatably secured to a bracket 175 which in turn is secured to a transverse angle member 176. The transverse member 176 is rigidly secured to angle members 178 whose forward ends are secured to the housing extension and whose rear ends are rigidly secured, as by welding to vertical angle posts 179 of the support frame 166.

It will be apparent that by the use of a plurality of the guide rollers which engage the bottom and top pipe 148 of the carriage 146, the carriage is guided and supported in its reciprocable forward and rearward movement relative to the housing. The carriage is reciprocably movable by any suitable drive means which may include a rack gear 180 rigidly secured, as by welding, to the bottom pipe 147 which meshes with a gear 181 on the drive shaft 182 of a suitable prime mover, such as a reversible pneumatic motor 183, mounted on a bracket 184 rigidly secured, as by welding, to the support frame 166.

The bottom pipe at its forward end has a nozzle 188 which directs a blast or stream of compressed air and grit particles radially outwardly at the inner surfaces of a casing being rotated in the housing by means of the support shafts 121 and 122 and their wheels.

The top carriage pipe 148 is provided at its inner end with an angular extension 190 having a top portion 191 whose rear end is rigidly secured to the inner end of the pipe 148, as by welding, and a downwardly and forwardly inclined portion 194 in whose lower end is secured a nozzle 195 for directing a stream or blast of compressed and abrasive grit particles at the outer surface of the bomb casing rotating in the housing. The extension 190 extends into a hood 200 which is rectangular in cross section having a top wall 201, side walls 202 and 203, a rear wall 204 and a top end wall 205. A collar 206 is rigidly secured to the top end wall 205 as by welding. The inclined portion 194 of the pipe extension extends into the hood through the collar. The hood is rigidly secured to the inner end of the pipe 148 by means of straps 210 welded to the collar which have horizontal extensions 211 welded thereto. The strap extensions are secured by means of bolts or screws 212 to two horizontal arms 213 welded to the inner end of the top carriage pipe 148.

A hood extension 215 is removably secured to the hood by means of bolts 216, the extension including a front striker plate 216 which forms a downward extension of the front wall 201 and side flanges 217 which form extensions of the side walls of the hood.

The nozzle directs a stream of compressed air and abrasive particles at the external surface of a casing at such an angle of incidence thereto that the grit particles ricochet from the casing forwardly and upwardly and impinge on the inner surface of the plate 216. The area A of impingement, FIG. 9, of the stream of particles is oval shaped and approximately one-half inch to one inch in its largest axis so that the concentration and velocity of the grit particles in the area of impingement are both relatively great thus subjecting such area of the outer surface of the casing to very thorough abrasive and cleansing action. The rear ends of the carriage pipes 147 and 148 are connected by means of flexible conduits or hoses 220 and 221 to a manifold 222 connected to the end of the outlet pipe 223 of a device 225 which provides a mixture of grit particles and compressed air to its outlet pipe 223. The device 225 may be of the type commercially available from the Sanstrom Manufacturing Company, Fresno, Calif.

Compressed air under pressure is supplied to the main housing 226 of the device 225 from a suitable source of compressed gas by means of a pipe 227. Charges of the abrasive grit, which may be iron or steel particles, may be introduced periodically into the housing from a hopper 90 when the device 225 is not in operation through a suitable inlet of the housing which is then closed. The device 225 operates in a well known manner, when compressed air is introduced into the housing 226, to provide a flow of compressed air and grit mixed therewith to the outlet pipe 223.

The speed of rotation imparted to the casing and the speed of movement of the carriage 146 are so related that all internal and external surfaces of the casing are subjected to the blasts or sprays of compressed air and grit particles from the nozzles 188 and 195, respectively, during both the forward and rearward movement of the carriage and all portions of such surfaces are thus twice subjected to the blasts of compressed air and abrasive grit particles during each full reciprocable movement of the carriage. Rearward movement of the carriage is limited by stops 230 connected to the angle members 179 of the frame which are engageable by an arm 231 secured to the brace member 149 when the carriage is in its rearmost position. When the carriage thus reaches its rearmost position illustrated in FIG. 1 as compressed air supplied to the pneumatic motor 183 causes the motor to move the carriage rearwardly, the rearward movement of the carriage will thus be stopped and the rotation of the rotor of the pneumatic motor will be arrested. Such forceable stopping of the rotation of the motor will not damage the motor, which may be of the type commercially available as Model No. 4AM–FRV–13A Gast Air Motor from Womack Machine Supply Co., Dallas, Tex. The rotor of the pneumatic motor 183 rotates in one direction as long as air is supplied to one of its fittings 233 and exhausted therefrom through its other fitting 234 to move the carriage forwardly and will operate in the opposite direction to move the carriage rearwardly when the compressed air is supplied to the motor through its fitting 234 and exhausted therefrom its fitting 233 until the rearward movement of the carriage is arrested.

The delivery of compressed air to the motor 183 is controlled by a four-way valve 235 which when in one of its operative positions causes compressed air delivered to its inlet fitting 236 through a conduit 237 from a manifold 238a to be delivered to its fitting 238 and thus through the conduit 239 which connects the valve fitting 238 and the motor fitting 233, to the motor 183 by establishing fluid communication between the fittings 236 and 238.

In this first operative position, the valve also establishes communication between its fittings 240 and 243 which thus permits exhaust air from the motor, whose fitting 234 is connected to the valve fitting 240, to escape to the atmosphere. In its other operative position, the valve 235 establishes fluid communication between its fittings 236 and 240 so that the compressed air is delivered to the fitting 234 of the motor and also simultaneously establishes fluid communication between its fittings 238 and 243 so that exhaust air from the motor fitting 233 is vented to the atmosphere.

The valve 235 may be of any well-known commercially available valve, such as the valve commercially available from the Womack Machine Supply Co., Dallas, Tex., as Model No. D4 AAA Products and includes an operator button 245 which is engaged by an arm 246 connected to the carriage when the carriage is moved forwardly to its extreme forward position to cause the valve to move from one of its operative positions to the other to reverse the circulation of air through the motor 183.

The conduit 227 through which compressed air is supplied to the device 225 may also be connected to the manifold and have a manually operated valve 247 connected therein. The pneumatic ram 144 similarly may be controlled by a four-way valve 250 of the same type as the valve 235 so that when its operator button 251 is moved to one position the valve 250 establishes fluid communication between its fittings 252 and 253 and also between its fittings 254 and 255. Compressed air delivered to the valve fitting 252 from the manifold 238a by a conduit 256 and may then flow through the conduit 257 which connects the fitting 253 to the fitting 258 of the ram cylinder 144a to the lower end of the ram cylinder and air is exhausted from the upper end of the ram cylinder, its fitting 259 being connected to the valve fitting 254 by a conduit 260.

The motor 128 which causes rotation of the support shaft 121 may also be supplied with compressed air from the manifold 238a through a conduit 261 having a valve 262 connected therein. As the motor 128 always rotates in the same direction, the valve 262 may be a two-way manually operated valve.

The manifold is supplied with compressed air from a suitable source by a conduit 264 which may have a main valve 265 connected therein. The conduit 264 may be connected to a tank of compressed air under high pressure into which air is pumped by a suitable pump, not shown.

The controls for the device 225 which supplies the mixture of compressed gas and grit to the pipes of the carriage, and for the valves 235, 247, 250 and 262 and electric switches 266 and 267 which control operation of the electric rotors 111 and 280 may be mounted within a suitable housing 269 mounted on the housing extension 156 where they are accessible to the operator.

The apparatus also includes a clean cut device 270 having a pipe 271 mounted for reciprocable movement through a suitable bushing 272 and an aperture in the end wall 71 of the housing 24 into a casing on the wheels 125 and 126 of the support shafts so that blasts of compressed air from a nozzle 272 on the end of the pipe will blow out of the casing any dirt and grit particles as the nozzle is moved reciprocably substantially the full length of the casing. The pipe 272 is supported for reciprocable horizontal movement by a support assembly 274 which includes a plurality of rollers 275 engageable with the pipe at angularly spaced locations thereabout and which are rotatably mounted on a frame 276 secured to the end wall 71 and to the brackets 129. Compressed air is supplied to the outer end of the pipe 271 by means of a flexible hose 278 which has a foot operated valve 279 connected therein. The other end of the hose is connected to the manifold 238.

The drive shaft of the conveyor motor 280 is connected by a chain and sprocket drive 281 to the top shaft 282 of the conveyor. The top and bottom shafts 282 and 283 of the conveyor are provided with aligned sprockets about which the two endless chains 89 of the conveyor extend.

In use, the cylindrical bodies, such as the bomb casings C, which are to be cleaned by means of the apparatus 20 may be placed on the storage rack 21 in horizontal positions with their longitudinal axes extending parallel to the longitudinal axis of the conveyor 22 and perpendicular to the longitudinal axis of the storage rack by means of suitable hoist apparatus and will then remain in their horizontal positions throughout their movement over the storage rack, the conveyor, into and out of the housing 24 and to the forward front end of the conveyor where their forward movement is stopped by the stop plate 52. Each casing when it reaches the front end of the conveyor is removed therefrom by suitable hoist apparatus onto pallets or other storage or transport means while still in its horizontal position. It is apparent that the handling of the heavy casings is greatly facilitated if they do not have to be moved to vertical positions.

A casing to be cleaned is rolled off the forward end of the storage rack 32 onto the rear end of the conveyor and then is moved forwardly and longitudinally over the rollers of the conveyor until its forward progress is arrested by the engagement of its front end with the positioning plate 54 which has been moved to its operative position. The door 58 being now in its raised position, the casing may then be rolled inwardly into the housing 24 through its side opening and onto the wheels 125 and 126 of the support shafts and between a pair of positioning plates 285 and 286 which extend transversely across the housing above the support and are secured in any suitable manner to the rear wall of the housing. The positioning plates limit longitudinal movement of the casing within the housing and on the wheels of the support shafts. The housing door 58 is then moved to its lower closed position, the blower motor and the conveyor motor are energized by closing the switches 266 and 267 so that air will be drawn inwardly through the discharge opening 84 of the hopper 79 into the housing and thence to the exhaust stack 108. The valve 262 will then be opened to cause the motor 128 to rotate the support shaft 121 and, therefore, of the bomb casing supported on the wheels 125 and 126 of the two support shafts.

The valve 235 will now be in its operative position wherein it supplies compressed air to the motor 183 to cause it to tend to move the carriage 146 rearwardly, such rearward movement of the carriage from its exteremely rearward position being prevented by the stop 230. The valve 247 will then be opened and cause delivery of compressed gas to the device 225. A mixture of air and grit or abrasive particles under high pressure is then delivered by the device 225 to its outlet conduit 223 and thus to the nozzles 188 and 216 at the forward ends of the lower and upper pipes of the carriage. The operator button 245 of the valve 235 is then operated by the operator to reverse the flow of air to the motor 183 which then causes the carriage to move forwardly at a predetermined speed sufficiently slow relative to the speed of rotation of the casing that as the casing is rotated by the wheels 125 of the support shaft 121 through one complete rotation, the areas of the internal and external surfaces of the casing subjected to the sprays or blasts from the nozzles 188 and 195 overlay areas of these surfaces subjected to the blasts during the immediately preceding rotation of the casing. As the upper nozzle 195 thus moves forwardly over the casing and the lower nozzle through the casing, the external and internal surfaces of the casing are subjected to high velocity blasts having a high concentration of grit particles since the area of impingement of each spray or blast of air and particles onto the surface of the casing is very small, these areas being oval shaped and between one-half inch to one inch long at the largest axes thereof. As the nozzles reach the forward end of the casing, the arm 246 of the carriage engages the operator button 245 of the valve 235 thus causing the valve 235 to move to its other operative position and the direction of rotation of the drive shaft of the pneumatic motor 183 is reversed. During the rearward movement of the carriage, both the internal and external surfaces of the casing are again subjected to the blasts of abrasive particles thus causing all areas o fthe surfaces to be subjected twice to the abrasive blasts during each complete cycle of reciprocable movement of the carriage. The blower 110 is constantly moving air upwardly through the aperture or discharge opening 84 of the hopper 79 and, since, the velocity of the air moving through the relatively small discharge opening 84 is, of course, very great, any dust and dirt particles which are relatively light are carried upwardly by such circulation of air and then to the exterior to a remote location through the duct 113 while the abrasive grit discharged by the nozzle is free to move downwardly through the discharge opening to the trough 85. The nozzle 195 directs its spray forwardly and downwardly on the top surface of the casing and the most of the particles are thus caused to ricochet forwardly and upwardly from the casing toward the strike plate 216. In hitting the strike plate, the particles lose their energy and velocity and then fall downwardly off the casing, which is constantly rotating, into the hopper. The other walls of the hood limit outward moving of any particles which may ricochet in other directions off the external surface of the casing.

As the support shaft 121 is rotated constantly in the same direction, for example, counterclockwise as seen in FIG. 5, the casing is caused to rotate in a clockwise manner and as the carriage moves forwardly, the area of impingement of the blast of abrasive particles from the top nozzle, as illustrated in FIG. 8, is caused to describe a helical path about the external surface of casing with rear end portion of the area of the external surface subjected to the blast during one completion of rotation of the casing overlapping the forward end o fthe area subjected to the blast during the immediate prior complete rotation of the casing. During the rearward movement of the carriage ,the direction of such helical path is, of course, reversed and all portions of the external surfaces are again subjected to the blast of abrasive particles.

The area of impingement of the stream of grit particles and compressed air from the lower nozzle 188 describes a similar path over the internal surfaces of the casing and thus all internal surfaces of the casing are also subjected to two blasts of abrasive grit during each complete reciprocable movement of the carriage.

When the carriage reaches its extreme rearward movement at the completion of each cycle of its reciprocable movement, the frame stop 230 engages the carriage arm 231 and rearward movement of the carriage is arrested. The operator now closes the valve 247 and moves the cleanout device 270 inwardly into the housing while opening the valve 279 to cause all grit dirt particles which may be left in the casing to be blown out of the casing as the nozzle is moved back and forth through the casing. At this time, if desired, the blower motor may be de-energized, the housing door is opened, and the valve 262 is closed to stop operation of the motor 128. The operator button 251 of the four-way valve 250 is then actuated to cause high pressure to be introduced into the lower end of the ram cylinder 144a below its piston and cause the piston rod to move to its extended position and rotate the shaft 141 in a clockwise direction, FIG. 2. During this rotation of the shaft 141 its arms 143 engage the casing and move the casing off the wheels 125 and 126 of the support shafts, through the housing side opening and back onto the rollers of the conveyor. The shaft 141 is rotated with such force that it imparts sufficient momentum to the casing to cause its outward movement through the housing side opening and over the top edge of the front hopper wall 78 and the channel frame member 40 of the conveyor after the arms loose contact therewith. The operator button 251 is then actuated again to cause the piston of the ram to move back to its retracted positions so that the arms 143 are again in their inoperative positions illustrated in the drawings.

The cleaned casing is then moved forwardly on the conveyor, after the positioning plate has been moved to its inoperative position, until it is stopped by the front stop plate 52, the positioning plate 54 is again moved into operative position and the next casing to be cleaned is moved forwardly on the conveyor until its forward movement is stopped by the positioning plate and it is in alignment with the housing opening 25. The above steps of operation of the apparatus are then repeated to clean the next casing C. During the forward and rearward movement of the carriage during which a casing in the housing is being cleaned, the previously cleaned casing on the forward end of the conveyor may be removed by a suitable pneumatic hoist device operated by the operator since the movement of the carriage is automatically reversed once it has reached its most forward position and its rearward movement is arrested when it reaches its most rearward position upon the completion of one complete cycle of its reciprocable movement. Alternatively, the operator may load casing onto the storage rack or roller, then off the storage rack onto the conveyor during such cycle of operation of the carriage.

When a sufficient quantity of grit accumulates in the hopper 90 which has previously been circulated through the housing and then moved back into the hopper 90 by means of the bucket conveyor 89 and while the valve 247 is closed, the contents of the storage hopper 90 are moved into the device 225 after the inlet opening of its housing has been opened. Suitable closure means may be provided both in the lower end of the hopper and of the housing of the device.

It will now be seen that a new and improved apparatus has been illustrated and described which permits a single operator to easily and quickly move casings from a storage rack and into the housing of a cleaning apparatus to be cleaned thereby and to remove the cleaned casings from the housing.

It will further be seen that the nozzles of the apparatus are positioned relatively close to the surfaces of the casing to be cleaned thereby so that the areas of the casing on which impinge the sprays of abrasive particles or grit are relatively small, the concentration of such impinging particles during any instant of time is very great and the velocity and energy of such particles is great because the particles do not spread out over a large area and do not travel any great distance upon their discharge from the nozzle. As a result, a very thorough cleaning of the surfaces of the casing subjected to such blasts or sprays of grit and compressed air is achieved even though the rate of ejection of the compressed air and abrasive particles may be relatively small and thus not require the provision of large capacity means for supplying the compressed air and abrasive particles to the carriage pipes.

It will further be seen that the upper nozzle of the apparatus which directs the blasts of abrasive particles onto the external surface of the casings is positioned within a housing and the blast of abrasive particles is directed at such angle to the casing that they ricochet at such an angle from the casing and are directed and impinge on the inner surface of the replaceable strike plate 216, which is formed of a hardened steel or other very durable material, so that the wear of the operative components of the apparatus within the housing as well as of the housing itself by the impingement thereon of ricocheting abrasive particles is precluded. The disposition of the upper nozzle in an open bottom hood, the bottom edges of whose walls are spaced only a short distance from the external surfaces of the casing, further ensures that the velocity and energy of the particles moving downwardly off the casing and from the hood between the bottom edges of the hood and the casing are spent and they will not therefore cause undue abrasive wear of the housing and of the components of the apparatus positioned in the housing.

It will further be seen that the abrasive particles sprayed into the interior of the casing cannot ricochet directly from the internal surfaces of the casing out through its ends into the housing so that the nozzle 272 does not require such hood.

It will further be seen that all operative components of the apparatus which move the carriage, rotate the casing within the housing, and operate the removal device are located externally of the housing and thus are not exposed to the abrasive particles.

It will further be seen that, while the pneumatic drive for the casing rotating means and for the carriage moving means has been illustrated and described, electric motors could be employed for this purpose instead of the pneumatic motors illustrated and described.

The foregoing description of the invention is explanatory only and changes in the details of the construction illustrated may be made by those skilled in the art, within the scope of the appended claims, without departing from the spirit of the invention.

What is claimed and desired to be secured by Letters Patent is:

1. An apparatus for cleaning elongate cylindrical bodies each having a longitudinal passage open at at least one end of the body and having external and internal surfaces, said apparatus including: a housing; support means in said housing engageable by external surfaces of a cylindrical body for supporting and rotating a cylindrical body in horizontal position about its longitudinal horizontal axis, said housing having an opening through which cylindrical bodies are movable into said housing onto said support means and off said support means and from the housing; closure means for said opening; nozzle means for directing a spray of abrasive particles on a small area of external surfaces of the cylindrical body as the cylindrical body is supported and rotated by said support means, said nozzle means being movable in the housing longitudinally relative to a body being supported and rotated by said support means and spaced a relatively small distance from external surfaces of the body to cause a spray of abrasive particles from said nozzle means to describe a helical path over external surfaces of the body to subject all areas of external surfaces of the body to said spray as said body is being rotated; means located externally of said housing for driving said support means and said nozzle means in predetermined relation to cause the areas of external surfaces of a cylindrical body subjected to the sprays during successive rotations of the cylindrical body to overlap whereby all surfaces of the body are subjected to the spray during each longitudinal movement of the nozzle means in the housing; control means operatively associated with said drive means of said nozzle means for causing said nozzle means to move first longitudinally forwardly in the housing over a cylindrical body being rotated by said support means and then rearwardly thereover whereby all external surfaces of the body are subjected twice to the spray of the abrasive particles; and second nozzle means movable simultaneously with said first mentioned means, said second nozzle means being movable into a longitudinal passage of a cylindrical body at one end thereof, which body is supported by said support means and directing a spray of abrasive particles at a small area of internal surfaces of a cylindrical body supported and rotated by said support means.

2. The apparatus of claim 1, and means movable longitudinally into a longitudinal passage of a cylindrical body through an open end thereof which is supported on said support means for delivering a stream of air into the body to clean out abrasive particles and dirt from the cylindrical body.

3. The apparatus of claim 2, and exhaust means operatively connected to said housing for drawing air from the upper portion of the housing.

4. The apparatus of claim 3, and hopper means below said support means, said hopper means having a small downwardly discharge opening whereby when air is moved upwardly through said discharge opening by said exhaust means heavy abrasive particles move from said housing and said hopper means downwardly through said discharge opening while light dust and dirt particles are removed from the housing by the air being moved by said exhaust means.

5. The apparatus of claim 4, and a conveyor extending parallel to said opening of said housing over which the cylindrical bodies are movable longitudinally into longitudinal alignment with said opening of said housing.

6. The apparatus of claim 5, and removal means for moving cylindrical bodies from said support means through said housing opening, and means positioned exteriorly of said housing for operating said removal means.

7. The apparatus of claim 6, and a storage rack extending perpendicularly from said conveyor at a location remote from said housing on which cylindrical bodies are positionable in horizontal longitudinally parallel relation and are movable from said storage rack onto said conveyor for transport thereby to position in longitudinal alignment with said housing opening, and positioning means movable into operative position over said conveyor for engaging a cylindrical body to arrest its movement on said conveyor when said cylindrical body is in longitudinal alignment with said housing opening.

8. An apparatus for cleaning elongate cylindrical bodies each having a longitudinal passage open to the exterior of the body at at least one end thereof and external and internal surfaces, said apparatus including: a housing having longitudinally spaced end walls and a side opening through which cylindrical bodies are movable into and from the housing; closure means for closing said side opening; support means in said housing for supporting a cylindrical body in longitudinally extending position between said end walls and for rotating the body about its longitudinal horizontal axis, said support means including a drive shaft; drive means disposed externally of said housing for rotating said drive shaft; a carriage including a top conduit and a bottom conduit, one end wall of said housing having vertically spaced apertures through which said conduits extend into said housing, said top and bottom conduits at their inner ends disposed in the housing having first and second nozzle means, respectively, the other ends of said conduits disposed outwardly of said housing being connectable to a means for supplying a mixture of air under pressure and abrasive particles; drive means disposed externally of said housing for moving said carraige reciprocably to move said nozzle means longitudinally in said housing between said end walls, said second nozzle means being movable longitudinally into and through the longitudinal passage of a cylindrical body through an end thereof at which the passage opens to the exterior of the cylindrical body supported in said housing by said support means for directing a spray of abrasive particles on a small area of internal surfaces of the body and said first nozzle being movable longitudinally relative to a cylindrical body supported by said support means for directing the spray of abrasive particles on a small area of external surfaces of the body.

9. The apparatus of claim 8, wherein said drive means for rotating said drive shaft and said drive means for moving said carriage cause the speed of rotation of said drive shaft and the speed of movement of said carriage to have a predetermined relation for causing the areas of the external and internal surfaces of a cylindrical body subjected to sprays of abrasive particles during successive rotations of the cylindrical body to overlap whereby the internal and external surfaces of the body are subjected to sprays during each longitudinal movement of said carriage relative to said housing.

10. The apparatus of claim 9, and control means operatively associated with said drive means of said carriage for causing said nozzle means to move first longitudinally forwardly in the housing over a cylindrical body being rotated by said support means and then rearwardly thereover whereby the internal and external surfaces of the body are subjected twice to the sprays of the abrasive particles.

11. The apparatus of claim 9, and cleanout means for delivering a stream of air into a cylindrical body supported by said support means, said cleanout means comprising a conduit extending into said housing through the other of said end walls of said housing and provided with a third nozzle means at its inner end, said third nozzle means being movable longitudinally through a longitudinal passage of a cylindrical body supported by said support means.

12. The apparatus of claim 9, and exhaust means for exhausting air from the upper portion of said housing and hopper means below said support means, said hopper means having a small downwardly opening discharge opening whereby when air is moved upwardly through said discharge opening by said exhaust means heavy abrasive particles move downwardly from said housing through said discharge opening while light dust and dirt particles are removed from the air by the air being moved by said exhaust means.

13. The apparatus of claim 9, and a hood disposed about said first nozzle means, said hood having an open end, edges of said hood defining its open end being adapted to be spaced a small distance from the external surfaces of a cylindrical body on said support means when said first nozzle means is moved longitudinally relative to said support means, said first nozzle means directing a spray of abrasive particles angularly at external surfaces of the cylindrical body to cause abrasive particles discharged by said first nozzle means to ricochet from external surfaces of the body and impinge on a strike area of said hood.

14. An apparatus for cleaning elongate cylindrical bodies each having a longitudinal passage open to the exterior of the body at at least one end thereof, each of the bodies having external and internal surfaces, said apparatus including: a housing having an opening through which cylindrical bodies are movable into and from the housing; closure means for said opening; support means in said housing for supporting and rotating a cylindrical body in horizontal position about its longitudinal horizontal axis; nozzle means for directing a spray of abrasive particles at a small area of external surfaces of a cylindrical body as the body is supported and rotated by said support means, said nozzle means being movable in the housing longitudinally relative to a body being supported and rotated by said support means and spaced a relatively small distance from external surfaces of the body causing the spray of abrasive particles from said nozzle means to describe a helical path over external surfaces of the body to subject all areas of the external surfaces to the spray as said body is being rotated; and a hood disposed about said nozzle means, said hood having an open end, edges of said hood defining its open end being adapted to be spaced a small distance from external surfaces of a cylindrical body on said support means when said nozzle means is moved longitudinally relative to said support means; said hood having an internal strike surface and said nozzle means directs a spray of abrasive particles angularly at external surfaces of a cylindrical body supported by said support means to cause abrasive particles discharged by said nozzle means to ricochet from the external surfaces of the cylindrical body and impinge on said strike surface of said hood, said hood having a removable means providing said strike surface.

References Cited

UNITED STATES PATENTS

| | | | |
|---|---|---|---|
| 708,880 | 9/1902 | Heideger | 51—15 |
| 1,476,854 | 12/1923 | Tilley | 51—15 |
| 1,952,848 | 3/1934 | Eckler | 51—14 |
| 2,351,272 | 6/1944 | Le Tourneau | 51—15 |
| 2,495,269 | 1/1950 | Lindmark | 51—15 |
| 2,565,341 | 8/1951 | Arispe | 51—15 |

LESTER M. SWINGLE, Primary Examiner